Patented May 9, 1950

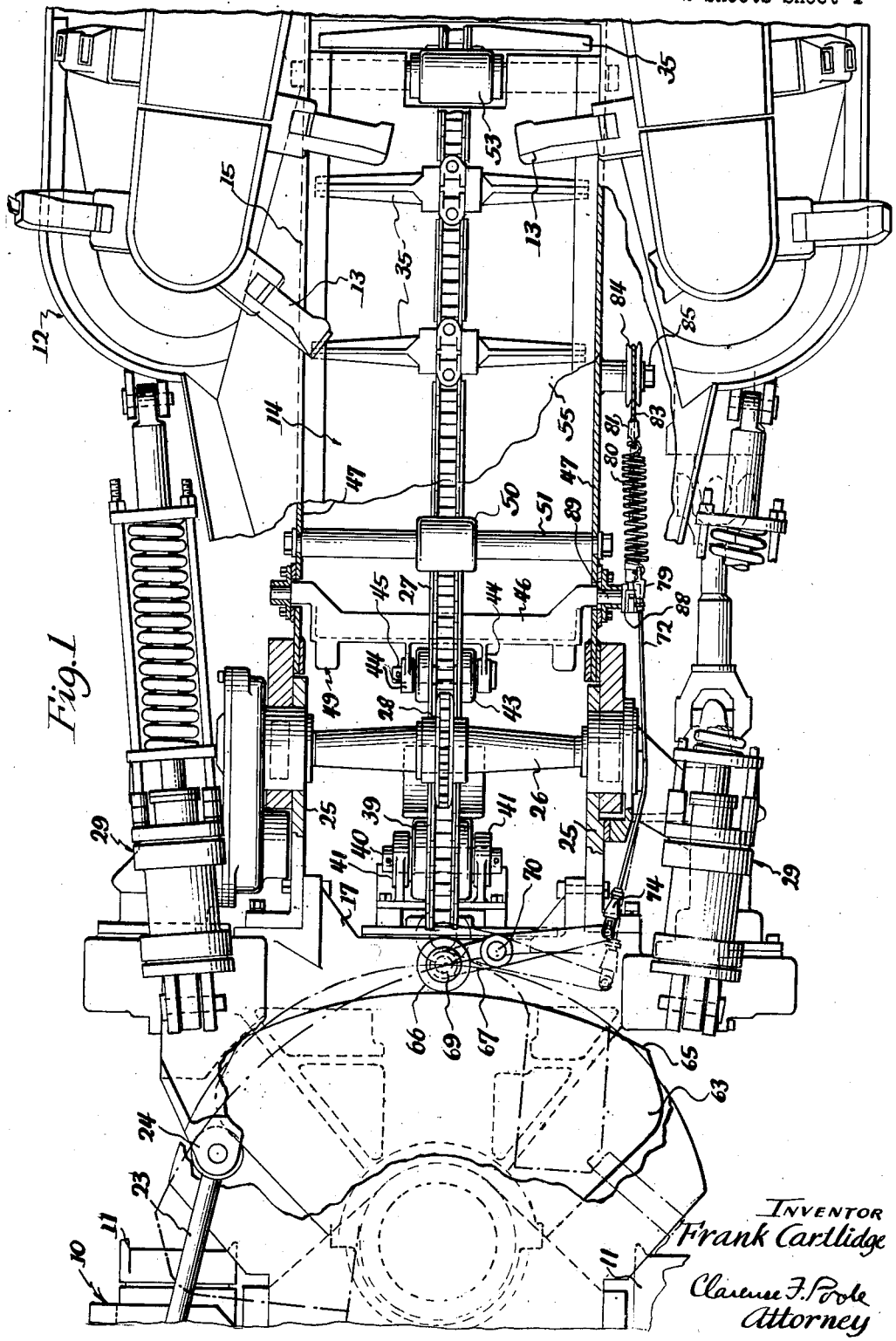

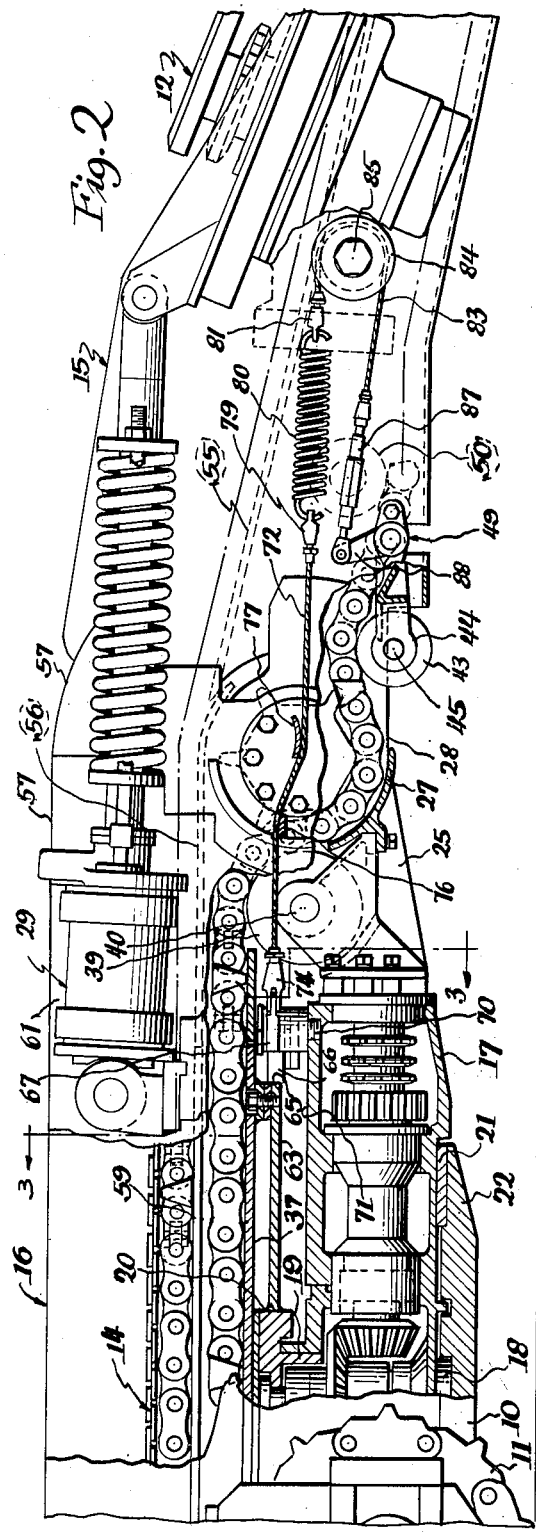

2,506,579

UNITED STATES PATENT OFFICE 2,506,579

TENSIONING DEVICE FOR ARTICULATING CONVEYERS

Frank Cartlidge, Chicago, Ill., assignor to Goodman Manufacturing Company, Chicago, Ill., a corporation of Illinois Application May 10, 1947, Serial No. 747,249

5 Claims. (Cl. 198—208)

1

This invention relates to improvements in conveyors, and more particularly relates to an improved tensioning device for an articulated conveyor of the endless chain and flight type adapted to be used in loading machines of the type operable in confined spaces such as mines.

The principal objects of my invention are to provide an efficient novel and simple form of tensioning device for the chain of an articulated flight conveyor of the center strand endless chain type, so arranged as to compensate for changes in length of the path of travel of the chain of the conveyor as the conveyor moves from a central aligned position to either of its extreme positions of articulation and to maintain a substantially uniform tension on the chain of the conveyor in all positions of articulation thereof.

In carrying out my invention I provide a cam extending transversely of the conveyor adjacent its point of articulation, the cam face of which corresponds to the changes in length of the path of travel of the conveyor chain as the conveyor swings laterally from one extreme position of lateral adjustment to the other. I also provide a tension idler for engagement with the lower run of the chain of the conveyor and flexibly connect this tension idler to a cam follower engaging the face of the cam so that as the conveyor swings from a longitudinally aligned position to an extreme lateral position of adjustment, the conveyor chain will be taken up to compensate for the difference in length of its path of travel in its various positions of articulation.

These and other objects of my invention will appear from time to time as the following specification proceeds and with reference to the accompanying drawings in which:

Figure 1 is a fragmentary plan view of the forward end of a loading machine with certain parts thereof broken away and certain other parts shown in substantially horizontal section in order to more clearly illustrate certain details of my invention;

Figure 2 is a fragmentary view in side elevation of the machine shown in Figure 1, with certain parts thereof shown in substantially longitudinal section; and Figure 3 is a partial fragmentary transverse sectional view taken substantially along line 3—3 of Figure 2.

In the drawings the form of my invention illustrated is shown as being embodied in a face loading machine of the type particularly adapted for use in gathering and loading coal into cars in mines. Said machine is constructed along lines somewhat similar to those shown and described in my prior patent No. 2,388,385, dated November 6, 1945, so will only herein be described in sufficient detail to make my present invention readily understandable.

2

The loading machine includes generally a main frame 10 mounted on two laterally spaced continuous tread devices 11, 11 and having a gathering and loading element 12 projecting forwardly from its forward end. Said gathering and loading element includes two laterally spaced orbitally guided chain gathering devices 13, 13 at the forward end of said gathering and loading element and extending along opposite sides of and forwardly of the forward end of a conveyor 14, for picking up loose material from the ground and moving it onto said conveyor. Said conveyor extends from one end of the machine to the other, as in my aforementioned patent, and includes a vertically and laterally swingable inclined elevating portion 15 extending forwardly of the forward end of said main frame in a downwardly inclined direction towards the ground, a central portion 16 forming a rearward continuation of said elevating portion and extending over the top of said main frame and secured thereto so as to be stationary with respect thereto, and a laterally swinging discharge portion (not shown) extending rearwardly beyond the rear end of said main frame.

The inclined elevating portion 15 of the conveyor 14 is supported in advance of the main frame 10 on a laterally movable support frame 17 for lateral movement with respect to said main frame and for vertical adjustment with respect thereto. Said support frame is pivotally mounted adjacent the forward end of said main frame on a vertical dead shaft 18, mounted at its upper and lower ends in said main frame. Said support frame is also mounted adjacent its upper end on a bearing boss 19 coaxial with said dead shaft and depending from a top portion 20 thereof, which is spaced vertically from a forwardly projecting support plate 21 of said main frame. Said support frame also rests on and slidably moves along a forwardly spaced arcuate bearing plate 22 mounted on the top surface of said forwardly projecting support plate 21 of said main frame, and extends a substantial distance in advance of the forward end of said bearing plate. A piston rod 23 extensible from a fluid pressure cylinder (not shown) pivotally connected to said main frame, is vertically pivoted to an ear 24, projecting from said support frame adjacent one side thereof. Said cylinder and piston rod are provided to swing said support frame and gathering and loading element laterally about the axis of said vertical shaft 18.

The gathering and loading element 12 and the inclined elevating portion 15 of the conveyor 14 are transversely pivoted to opposite laterally spaced forwardly projecting vertical side plates 25, 25 of the support frame 17, coaxially with a transverse drive shaft 26, which serves to drive a chain 27 of said elevating conveyor through a sprocket 28, keyed on said shaft. Vertical adjustment of said elevating conveyor is effected by two laterally spaced fluid pressure cylinders and pistons indicated generally by reference characters 29, 29. Said cylinders and pistons are connected between the upper forward end portion of said support frame and said gathering and loading element, as in my aforementioned Patent No. 2,388,385.

The conveyor 14 is herein shown as being of a well known form of single center strand laterally flexible endless chain type of flight conveyor having a plurality of flights 35, 35 vertically pivoted to adjacent ends of sections of the endless chain 27, so said chain will flex laterally upon lateral movement of said elevating conveyor. Said endless chain and flights change their direction of travel from the upper to the lower run of the conveyor about an idler (not shown) at the overhanging discharge end of the conveyor and extend forwardly therefrom beneath the material carrying surface of the conveyor along a plate 37 of the central stationary part 16 of the conveyor. From said plate said chain extends over an idler roller 39 journaled on a horizontal shaft 40 mounted in brackets 41, 41 extending forwardly of the swinging support frame 17, between the side frame plates 25, 25 of said support frame. From thence said chain extends under and is meshed with the drive sprocket 28 on the transverse shaft 26. Said chain then extends over a tension idler 43 mounted between a pair of spaced brackets 44, 44, on a horizontal shaft 45. Said brackets project from a transverse bar 46, pivotally mounted adjacent its opposite ends in opposite side walls 47, 47 of the inclined elevating portion 15 of the conveyor. Said bar and brackets form one lever arm of a bell crank 49, as will hereinafter more clearly appear, as this specification proceeds. From said tension idler said chain extends forwardly beneath an idler 50 journaled on a transverse shaft 51 mounted at its ends in said side walls 47, 47. Said chain then extends forwardly from said idler 50 to and around an idler 53 at the forward end of said conveyor about which it changes its direction. From thence said chain and flights extend upwardly along a plate 55 forming the material carrying surface of the inclined elevating portion of the conveyor to and along a plate 56 forming the material carrying surface of a horizontal laterally movable portion 57 of the conveyor. Said chain and flights then extend along a bottom plate 59 of the stationary horizontal portion 16 of the conveyor, and to and along the overhanging discharge portion of said conveyor (not shown) where they reverse their direction of travel at the rear end thereof. Flexible side walls 61, 61 connect the horizontal laterally movable portion 57 of the conveyor with the stationary horizontal portion 16 thereof as in my aforementioned prior Patent No. 2,388,385, to provide continuous side walls for the conveyor when in its various positions of articulation.

The means for maintaining a uniform tension on the conveyor chain 27 in all positions of lateral adjustment of the laterally movable elevating portion 15 of the conveyor with respect to the stationary horizontal portion 16 thereof, includes a cam 65 formed on the forward end of a plate 63 spaced a slight distance beneath the bottom plate 37 and extending forwardly from the top wall portion 20 of the main frame 10. Said cam is formed to move the tension idler 43 to correspond to the changes in length of the path of travel of the conveyor chain 27 as it moves laterally from one extreme position to another, and to cause said tension idler to take up or relieve tension from said chain so as to provide a uniform tension on said chain in all positions of articulation thereof.

It should here be understood that the path of travel of the chain 27 shortens as the conveyor swings to one side or another from the longitudinal center line of the machine. The reason for this is that clearance is provided between the ends of the flights 35, 35 and the side walls of the conveyor, and as the conveyor swings about the axis of the shaft 18, said flights engaging one of the side walls of the conveyor at their ends will permit the chain to move to one side or the other of said axis and cut the corner about which the conveyor pivots.

The cam 65 is engaged by a follower or roller 66 on one end of a lever 67. Said follower is herein shown as being mounted on the top surface of said lever on a vertical pin 69, herein shown as being threaded within said lever. Said lever is mounted intermediate its ends on a vertical pin 70, for movement about a vertical axis. Said vertical pin is herein shown as being threaded in a top forward portion 71 of the laterally swingable support frame 17 and moves laterally with said frame. A flexible cable 72 has a connector 74 secured to one of its ends, which is pivotally connected to the opposite end of said lever from said follower. Said cable extends in a forward direction from said end of said lever between vertically and longitudinally spaced guide shoes 76 and 77, and has a connector 79 secured to its forward end. A tension spring 80 is herein shown as being hooked to said connector. The opposite end of said tension spring is herein shown as being hooked to a connector 81 on the rear end of a flexible cable 83. Said cable extends forwardly from said spring around an idler sheave 84 rotatably mounted on a horizontal pin 85 projecting outwardly from the right-hand side wall 47 of the conveyor. From thence said cable extends in a rearward direction towards the bell crank 49, and is connected to a turnbuckle indicated generally by reference character 87: said turnbuckle is pivotally connected to a lever arm 88 which forms the other lever arm of the bell crank 49. Said turnbuckle may be of any well known form and is provided to initially take up tension on the cables 72 and 83 through the tension spring 80, so as to hold said cables under tension and maintain the follower 66 in engagement with the cam 65, and the tension idler 43 in engagement with the under side of the conveyor chain 27. Said lever arm 88 is secured to the outer end of a shaft 89, herein shown as being formed integrally with the transverse bar 46.

It may be seen from the foregoing that when the follower 66 is in the position shown by solid lines in Figure 1, the tension idler 43 will be in a lowermost position, since at this point the sections of the conveyor will be in longitudinal alignment with each other and the path of travel of the conveyor chain will be longer than when the conveyor is swung laterally about the axis of the shaft 18. As the swingable portion 15 of the conveyor is swung laterally to the right, the follower 66 will move in a counter-clockwise direction, and when in an extreme position to the right or left will be in the position shown by broken lines in Figure 1. Said broken lines diagrammatically indicate the position of said follower on said cam, when said conveyor is in an extreme position to the right of the center line of the machine. When said follower is in this position, the lever 67 will pivot about the pin 70 in a clockwise direction. This will pivot the bell crank 49 in a similar direction and will move the tension idler 43 upwardly to take up on the conveyor chain 27 an amount sufficient to maintain tension on said chain at the same value as when the conveyor is in a longitudinally extended position.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In an articulated conveyor, two aligned troughs one of which is horizontally swingable with respect to the other, a laterally flexible conveyor extending along said troughs including an endless chain having spaced apart flights connected thereto, and means for maintaining a uniform tension on said chain in all positions of articulation of said troughs including a cam extending transversely of said troughs adjacent the point of articulation thereof, a follower having engagement with said cam, a movable tension idler having engagement with the lower run of said chain, and a flexible cable operatively connected between said follower and said idler for holding said follower in operative engagement with said cam and for operatively engaging said idler with said chain and moving said idler with said follower, to vary the effective length of said chain during lateral movement of said swingable trough.

2. In an articulated conveyor, two aligned troughs one of which is horizontally swingable with respect to the other, a laterally flexible conveyor extending along said troughs including an endless chain having spaced apart flights connected thereto, and means for maintaining a uniform tension on said chain in all positions of articulation of said troughs including a cam extending transversely of said troughs adjacent the point of articulation thereof, a lever having engagement with said cam and rocked thereby upon lateral movement of said swingable trough, a movable tension idler having engagement with the lower run of said chain, and a flexible member connected between said lever and idler for holding said lever in operative engagement with said cam and for engaging said idler with said chain and moving said idler in a direction to maintain a uniform tension on said conveyor in all positions of articulation thereof.

3. In an articulated conveyor, two aligned troughs one of which is horizontally swingable with respect to the other, a laterally flexible conveyor extending along said troughs including an endless chain having spaced apart flights connected thereto, and means for maintaining a uniform tension on said chain in all positions of articulation of said troughs including a cam extending transversely of said troughs adjacent the point of articulation thereof, a lever, a follower on said lever engaging said cam, a bell crank, a tension idler mounted on said bell crank for engagement with the lower run of said chain, and a flexible cable connecting said lever with said bell crank and holding said follower in engagement with said cam and said idler in engagement with the lower run of said chain and moving said tension idler to conform to movement of said follower, to vary the effective length of said chain during lateral movement of said swingable trough, so as to compensate for changes in length of the path of travel of said chain during lateral swinging movement thereof and to maintain a uniform tension on said chain in all positions of articulation of the conveyor.

4. In an articulated conveyor, two aligned troughs one of which is horizontally swingable with respect to the other, a laterally flexible conveyor extending along said troughs including an endless chain having spaced apart flights connected thereto, and means for maintaining a uniform tension on said chain in all positions of articulation of the conveyor including a cam extending transversely of said troughs adjacent the point of articulation thereof, a lever pivoted intermediate its ends for movement about a vertical axis, a follower on one end of said lever and adapted to engage said cam, a bell crank, a tension idler mounted on one lever arm of said bell crank for engagement with the lower run of said chain, and a flexible cable connected between the end of said lever opposite from said follower and said bell crank, for moving said bell crank and idler to conform to movement of said follower and to change the effective length of said chain to conform to the decrease in the length of its path of travel as said conveyor moves from a central aligned position to either of its extreme positions of articulation.

5. In an articulated conveyor, two aligned troughs one of which is horizontally swingable with respect to the other, a laterally flexible conveyor extending along said troughs including an endless chain having spaced apart flights connected thereto, and means for maintaining a uniform tension on said conveyor in all positions of articulation of the conveyor including a cam extending transversely of said troughs adjacent the point of articulation thereof, a lever pivoted intermediate its ends for movement about a vertical axis, a follower on one end of said lever and adapted to engage said cam, a bell crank, a tension idler mounted on one lever arm of said bell crank and adapted to engage the lower run of said chain, and a flexible cable connected between the end of said lever opposite from said follower and said bell crank, for moving said bell crank and idler to conform to movement of said follower and change the effective length of said chain to conform to the decrease in the length of the path of travel thereof as said conveyor moves from a central aligned position to either of its extreme positions of articulation, and a tension spring connected in said flexible cable for maintaining said cable under a predetermined tension and for yieldably holding said follower in engagement with said cam and said tension idler in engagement with said endless chain.

FRANK CARTLIDGE.

REFERENCES CITED

The following references are of record in the file of this patent:

UNITED STATES PATENTS

| Number | Name | Date |
| --- | --- | --- |
| 2,269,078 | Cartlidge | Jan. 6, 1942 |